(12) United States Patent
Trimmerman et al.

(10) Patent No.: US 7,203,181 B2
(45) Date of Patent: Apr. 10, 2007

(54) CDMA SYSTEM TRANSMISSION MATRIX COEFFICIENT CALCULATION

(75) Inventors: Chayil S. Trimmerman, Harleysville, PA (US); Ryan Samuel Buchert, Breinigsville, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 1091 days.

(21) Appl. No.: 10/264,192

(22) Filed: Oct. 3, 2002

(65) Prior Publication Data

US 2004/0001465 A1 Jan. 1, 2004

Related U.S. Application Data

(60) Provisional application No. 60/392,202, filed on Jun. 28, 2002.

(51) Int. Cl.
*H04L 12/50* (2006.01)
(52) U.S. Cl. ............... 370/335; 370/342; 370/252; 375/140
(58) Field of Classification Search ............ None
See application file for complete search history.

(56) References Cited

U.S. PATENT DOCUMENTS

| | | | |
|---|---|---|---|
| 5,793,759 A | 8/1998 | Rakib et al. | |
| 6,351,462 B1 | 2/2002 | Komatsu | |
| 2002/0015437 A1* | 2/2002 | Li et al. | 375/146 |
| 2002/0146062 A1* | 10/2002 | Bachu et al. | 375/144 |
| 2003/0095585 A1* | 5/2003 | Huh et al. | 375/140 |
| 2006/0072680 A1* | 4/2006 | Wang et al. | 375/267 |

FOREIGN PATENT DOCUMENTS

| | | |
|---|---|---|
| CN | 1271219 | 10/2000 |
| CN | 1271219 A | 10/2000 |
| EP | 0978951 | 2/2000 |
| JP | 2000349691 | 12/2000 |
| JP | 2000349691 A | 12/2000 |
| WO | 02/19558 | 3/2002 |
| WO | WO0219558 A1 | 3/2002 |
| WO | 02/39610 | 5/2002 |

* cited by examiner

*Primary Examiner*—Duc Ho
(74) *Attorney, Agent, or Firm*—Volpe and Koenig, P.C.

(57) ABSTRACT

A hermetian of a system response matrix is to be determined. Spreading codes, channel specific multipliers and channel impulse responses are provided. The channel code specific multipliers have real and imaginary values. Channel codes being a combination of a real spreading code, a complex scrambling code and a sign of the channel code specific multiplier. Real and imaginary components of an approximate hermetian of the system response matrix are determined. The channel code specific multipliers are applied to the real and imaginary components of a result of the convolutions to derive the hermetian of the system response matrix.

71 Claims, 6 Drawing Sheets

SCTD BLOCK COMBINATION

FIG. 6B

ADDRESS GENERATION FOR A^H MATRIX STORAGE

FIG. 7

CDMA SYSTEM TRANSMISSION MATRIX COEFFICIENT CALCULATION

This application claims priority to U.S. Provisional Application No. 60/392,202, filed Jun. 28, 2002.

BACKGROUND

The present invention relates to wireless digital communication systems. More particularly, the present invention relates to producing a system response matrix for such systems.

Figure 1:
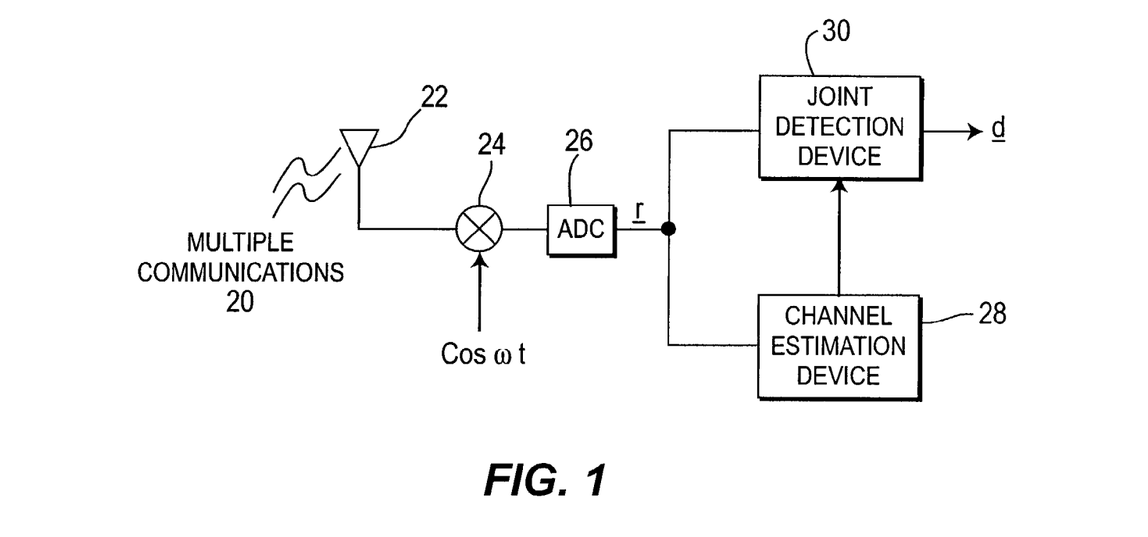
FIG. 1 is a simplified block diagram of a joint detection receiver.

In code division multiple access communication systems, multiple users send multiple communications simultaneously. The multiple communications are transmitted using different channel codes. The channel codes proposed for the time division duplex mode for 3GPP are derived by combining a spreading code with a scrambling code and subsequently applying a channel code specific multiplier. During transmission, each communication experiences a channel response. One approach to recover data from the transmitted bursts is joint detection, where all users data is received simultaneously. Such a system is shown in FIG. 1. The joint detection receiver may be used in a user equipment or base station.

The multiple communications 20, after experiencing their channel response, are received as a combined received signal at an antenna 22 or antenna array. The received signal is reduced to baseband, such as by a demodulator 24, and sampled at a chip rate of the codes or a multiple of a chip rate of the codes, such as by an analog to digital converter (ADC) 26 or multiple ADCs, to produce a received vector, r. A channel estimation device 28 uses a reference signal, such as a midamble code or pilot code, to estimate the channel response of the communications 20. A joint detection device 30 uses the estimated or known spreading codes of the users' bursts and the estimated or known channel responses to estimate the originally transmitted data for all the users as a data vector, d.

The joint detection problem is typically modeled by Equation 1.

$$Ad+n=r \quad \text{Equation 1}$$

d is the transmitted data vector; r is the received vector; n is the additive white gaussian noise (AWGN); and A is the system response matrix, and is constructed by convolving the channel responses with the known channel codes.

Two approaches to solve Equation 1 is a zero forcing (ZF) and a minimum mean square error (MMSE) approach. A ZF solution, where n is approximated to zero, is per Equation 2.

$$d=(A^H A)^{-1} A^H r \quad \text{Equation 2}$$

A MMSE approach is per Equations 3 and 4.

$$d=R^{-1} A^H r \quad \text{Equation 3}$$

$$R=A^H A+\sigma^2 I \quad \text{Equation 4}$$

$\sigma^2$ is the variance of the noise, n, and I is the identity matrix.

For either a zero forcing or MMSE solution, the hermetian of the system response matrix, $A^H$, is derived. In the proposed TDD mode of 3GPP, the system response matrix is derived using the spreading codes, the scrambling code, channel code specific multipliers and the determined channel responses. The real spreading code is mixed with a complex scrambling code. The mixed result is multiplied to the channel code specific multipliers (being either real or imaginary) and the result is convolved with the complex channel responses. After the system response matrix is derived, the hermetian is taken to produce the $A^H$ matrix. Producing the $A^H$ matrix is a complicated operation requiring complex multiplications. Implementing multiplications in hardware is undesirable due to the number of transistors required to produce a multiplier.

Accordingly, it is desirable to have alternate approaches to generate the hermetian of the system response matrix.

SUMMARY

A hermetian of a system response matrix is to be determined. Spreading codes, channel specific multipliers and channel impulse responses are provided. The channel code specific multipliers have real and imaginary values. Channel codes being a combination of a real spreading code, a complex scrambling code and a sign of the channel code specific multiplier. Real and imaginary components of an approximate hermetian of the system response matrix are determined. The channel code specific multipliers are applied to the real and imaginary components of a result of the convolutions to derive the hermetian of the system response matrix.

DESCRIPTION OF THE PREFERRED EMBODIMENTS

Although the preferred embodiments are described in conjunction with the preferred application of the invention for use in a third generation partnership project (3GPP) time division duplex communication system using code division multiple access, the invention can be applied to any code division multiple access communication system. A receiver utilizing the following embodiments can be utilized in a user equipment or a base station.

The preferred embodiment of the invention mixes, for a particular received burst, the spreading code, the scrambling code and the sign of the channel code specific multiplier, preferably by an exclusive-or gate to produce an approximate channel code. The approximate channel code is convolved with the channel response to produce that burst's contribution to an approximate $B^H$ matrix of the $A^H$ matrix. The real or imaginary component of the channel code specific multipliers are applied to the real and imaginary portions of the approximate contribution to the $B^H$ matrix to produce that burst's contribution to the $A^H$ matrix. All of the received bursts contributions are applied to produce the $A^H$ matrix.

Figure 2A:
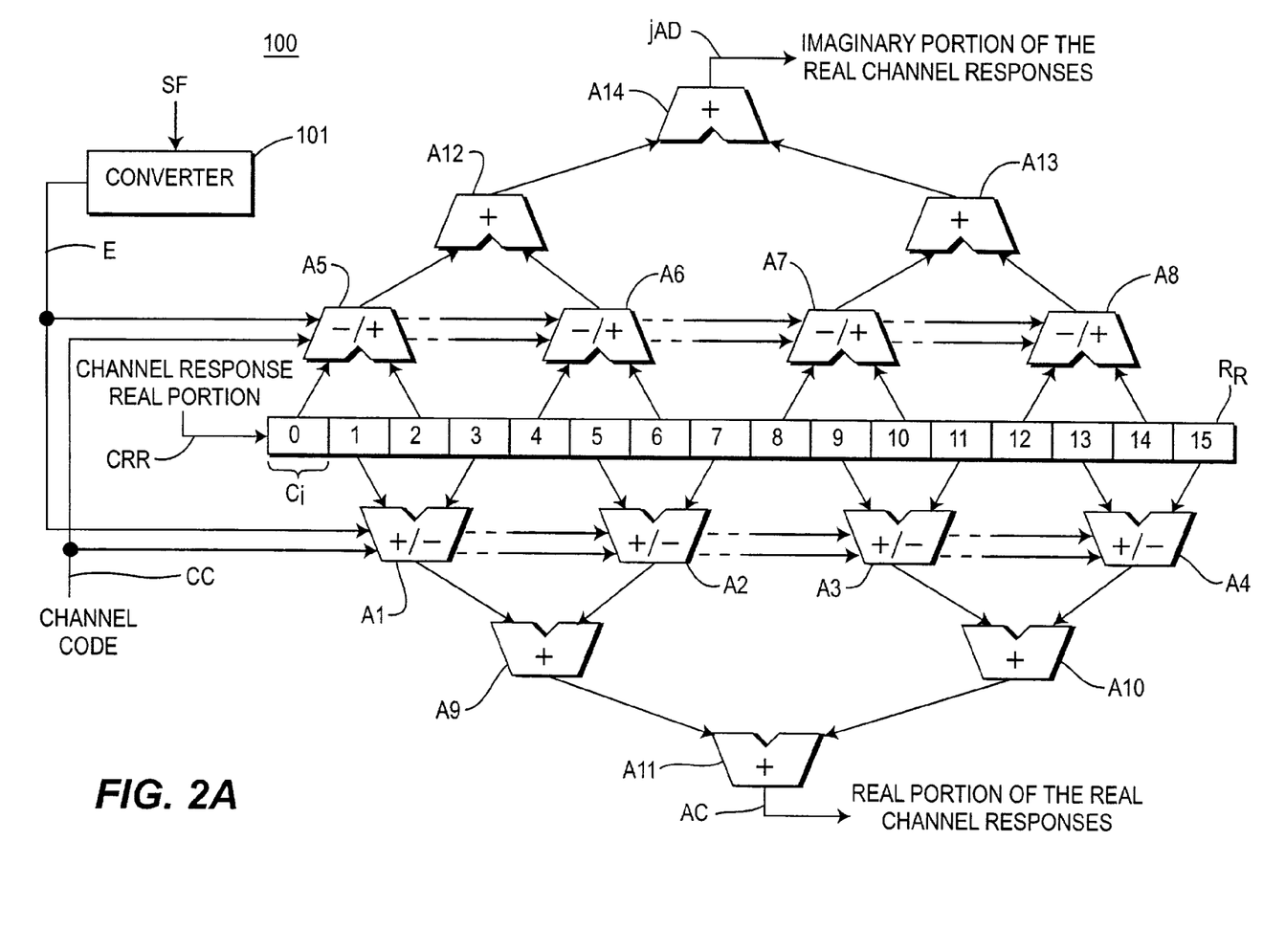
FIG. 2A shows the apparatus for convolving the real portion of the channel response.
Figure 2B:
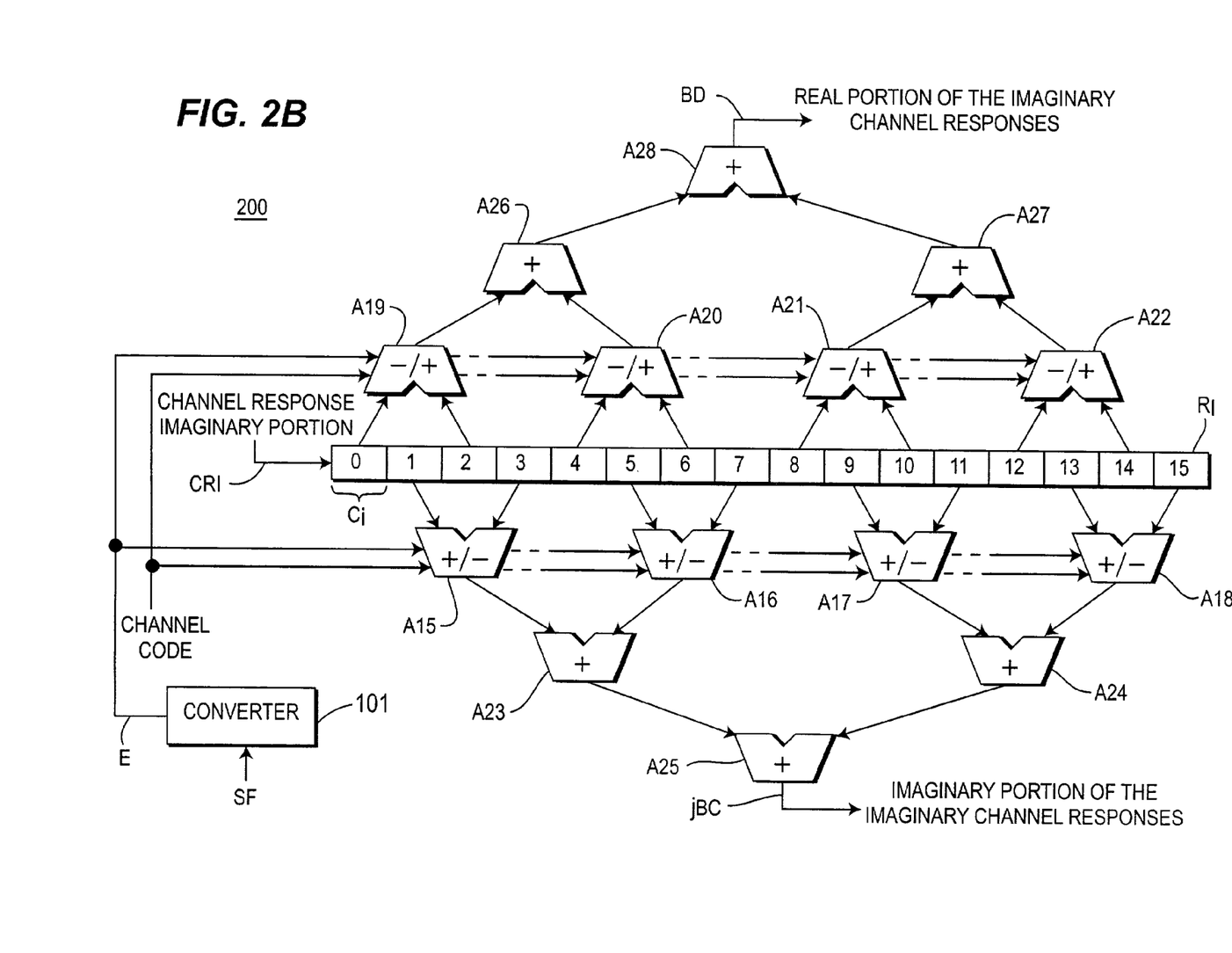
FIG. 2B shows the apparatus for convolving the imaginary portion of the channel response.

Referring to FIGS. 2A and 2B, the circuit diagrams 100 and 200, respectively, which perform convolution of a series of real and imaginary channel response chip values with the approximate channel code, are illustrated. The channel response values are divided into a real portion CRR and an imaginary portion CRI. The real channel response CRR is processed by the circuit 100 while the imaginary channel response CRI is processed in tandem by the circuit 200.

Figure 4:
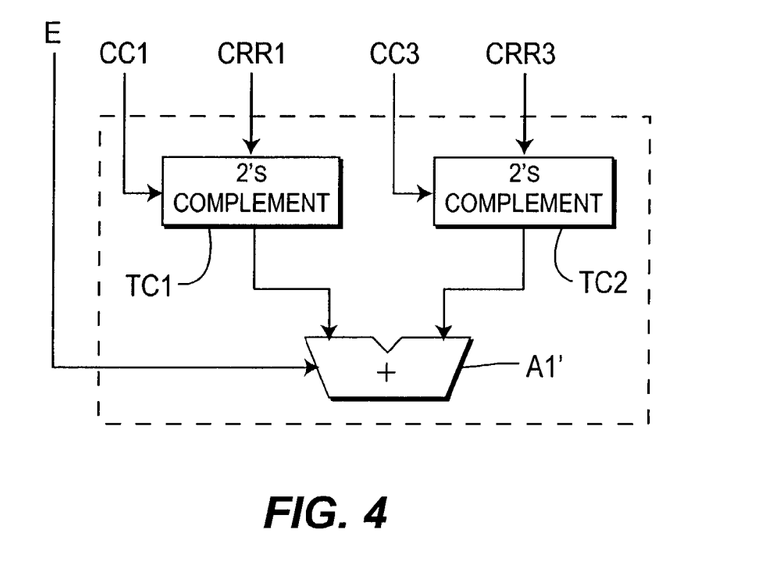
FIG. 4 shows a preferred circuit for adder tree inputs of FIGS. 2A and FIG. 2B.

In FIG. 2A, register $R_R$ is preferably a 16-location shift register, which receives the real portion of the channel response CRR. Each location Ci (i=0 to 15) of register $R_R$ has F bits per location where F is a selected data bit size, preferably 10. The number of locations corresponds with the preferred channel code size, which for TDD mode of 3GPP is 16 and is otherwise preferably a power of 2 in number. The real component circuit 100 includes a plurality of components A1–A14, each component has an adder having two inputs and a single output which is the sum of the two inputs. Adder/subtractor components A1–A8 are preferably configured as illustrated in FIG. 4. Adder components A9–A14 are preferably simple adders.

Adder/subtractor components A1, A2, A3, A4 receive input from the odd locations of register $R_R$ and perform either addition or subtraction on their pair of inputs. Similarly, adder/subtractor and adder components A5, A6, A7 and A8 are coupled to register $R_R$ to perform addition or subtraction on the channel response values, but only operate on the even locations of register $R_R$. Collectively, adder components A1–A4, A9–A11 form one adder tree circuit having inputs defined by components A1–A4 and an output defined by component A11. Similarly, adder components A5–A8, A12–A14 form a second adder tree circuit. The association of the adder tree circuits with the register $R_R$ is such that real and imaginary portions of processing values of the CRR values being processed through register $R_R$ are computed.

Acting as a control signal, a channel code CC having bits CC0 through CC15 are input to the adder/subtractor components A1 through A8. The binary channel codes control whether adder components A1 through A8 perform an addition or a subtraction dependent upon the respective control bit, preferably addition when the channel code CC bit =0 and subtraction when the channel code CC bit=1.

FIG. 4 illustrates a preferred construction of input adder component A1 having an adder A1' and two two's complement devices TC1, TC2. Inputs CRR1 and CRR3 receive the real channel response values contained in second and fourth locations C1, C3 of register $R_R$, which are processed by two's complement devices TC1, TC2. CCR value addition or subtraction is accomplished by the adder A1' summing the output of the two's complement devices TC1, TC2. The two's complement devices TC1, TC2 operate on the input values by either passing the value or its two's complement through to the adder A1'. The second bit CC1 of the 16 bit channel code control signal CC determines the operation performed by the two's complement device TC1 while the fourth bit CC3 of the channel code determines the operation performed by the two's complement device TC2.

Referring to FIG. 2A, adder A9 performs a summation of the sums performed by A1 and A2. Likewise, adder A10 sums the sum of A3 with the sum of A4, adder A12 performs the sum of A5 and A6, and adder A13 sums A7 with A8.

Adder A11 produces output AC, the real portion of the real channel response values, by adding the sum of A9 with the sum of A10. Output jAD, the imaginary portion of the real channel response values, is the sum produced by adder A14, which is the sum of the outputs of adders A12 and A13.

Processing circuit 200, shown in FIG. 2B, is constructed similarly to the circuit 100 shown in FIG. 2A. However, the shift register $R_I$ receives the imaginary portion of the channel response CRI. Components A15 through A28 correspond with adder components A1 through A14 to provide the register $R_I$ with two associated adder tree circuits. The two outputs of the tree circuits of circuit 200 shown in FIG. 2B are opposite of those shown in FIG. 2A for circuit 100, in that a value corresponding to a real portion shown as output BD comes from the even locations of register $R_I$ and a value corresponding to an imaginary output jBC is the final sum of the odd numbered locations of register $R_I$. The configurations of real and imaginary outputs relative to even and odd register locations could be completely reversed, and identical results could be obtained. Specifically, with registers $R_R$ and $R_I$ swapped in FIGS. 2A and 2B, output AC and jBC would be derived from even register locations and outputs BD and jAD would be derived from odd register locations.

Although the registers of FIGS. 2A and 2B have been represented with 16 locations apiece, convolution of channel response values in accordance with the present invention could generally be achieved using registers having $2^N$ register locations and a combination of more or less adders all configured accordingly to perform the sums on the even and odd register locations.

The four output values AC, BD, jAD and jBC of the circuits 100 and 200 represent real and imaginary portions of a multiplication operation as shown in Equation 1:

$$B^H=(A+jB)*(C+jD) \qquad \text{Equation 1}$$

where A is the real portion of the channel response, B is the imaginary portion of the channel response and where C corresponds to bits C1, C3, C5, C7, C9, C11, C13, C15 of the channel code CC, D corresponds to bits C0, C2, C4, C6, C8, C10, C12, C14 of the channel code. Each channel code bit represents a value that is either purely real or purely imaginary. Accordingly, the tree circuits can be hardwired to either all of the odd or all of the even locations of the registers $R_R$ and $R_I$. The trees used in accordance with the present invention for determining which channel code bits are real or imaginary eliminates the need for multipliers, which would consume hardware space to a greater degree.

Figure 3:
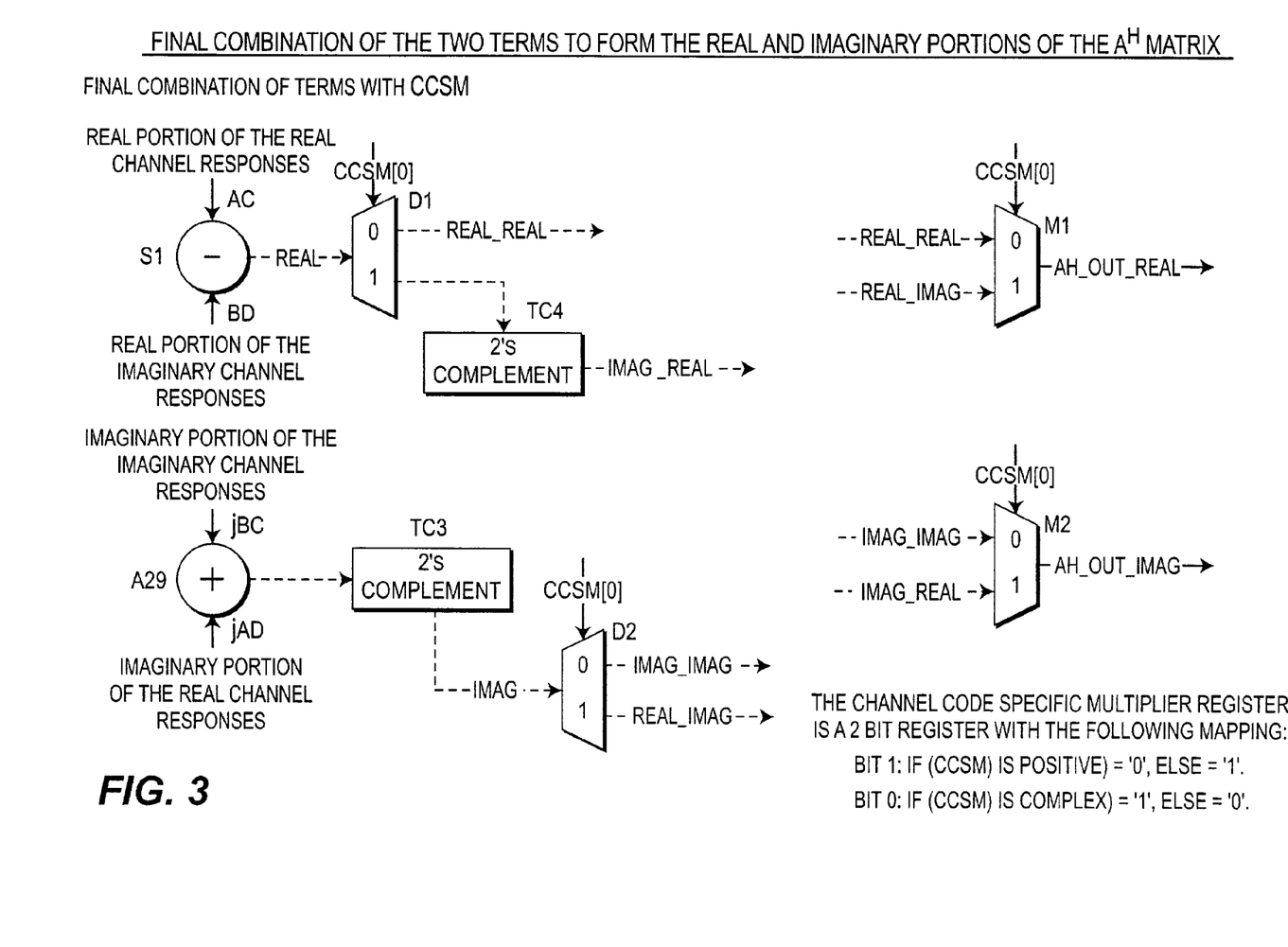
FIG. 3 shows the apparatus for summing the outputs of the FIG. 2A and FIG. 2B apparatuses to produce real and imaginary output used to construct the system response matrix.

As shown in FIG. 3, additional circuitry is provided to combine the outputs of the trees of circuits 100, 200 to produce coefficient values corresponding to real and imaginary output values of the approximate $B^H$ and apply the channel code specific multiplier to produce $A^H$. A subtracter S1 is associated with output AC of circuit 100 and output BD of circuit 200 to subtract the real portion of the processed real channel response signal and the real portion of the imaginary channel response signal. An adder A29 is associated with output jBC of circuit 200 and jAD of circuit 100 to sum the imaginary portion of the processed imaginary channel response signal and the imaginary portion of the real channel response signal. The sum produced by adder A29 is then passed through two's complement device TC3 for the imaginary output, which produces the complex conjugate of the B matrix.

After the real and imaginary contribution of the burst to the $B^H$ matrix is determined, the imaginary/real aspect of the channel code specific multiplier is applied to produce that burst's contribution to the $A^H$ matrix. Referring to FIG. 3, the channel code specific multipliers are preferably stored in a two bit register. Bit 1 in the register represents whether the channel code specific multiplier is positive (a zero value) or negative (a one value). Bit 0 in the register represents whether the channel code specific multiplier is imaginary (a value of one) or real (a value of zero).

Referring to FIG. 3, the real contribution is input into a demultiplexer D1. After applying the channel code specific multiplier, the real contribution to $B^H$ may correspond to the real contribution (Real_Real) to $A^H$ or the imaginary contribution (Imag_Real) to $A^H$. The demultiplexer D1 separates the real contribution of $B^H$ in response to bit 0 of the channel code specific multiplier. If bit 0 is a zero, the output is to Real_Real and if the channel code specific multiplier is a one, the output is to Imag_Real after the 2's complement is taken by a 2's complement device TC4.

Analogously, the imaginary contribution to $B^H$ may correspond to the imaginary contribution (Imag_Imag) to $A^H$ or the real contribution (Real_Imag) to $A^H$. The demultiplexer D2 separates the imaginary contribution of $B^H$ in response to bit 0 of the channel code specific multiplier. If bit 0 is a zero, the output is to Imag_Imag and if the channel code specific multiplier is a one, the output is to Real_Imag.

After separation, a pair of multiplexers M1, M2 are used to produce the real and imaginary contributions of the burst to the $A^H$ matrix. A real multiplexer M1 selects either the Real_Real or Real_Imag as the real contribution (ah_out_real). If bit 0 is a zero, the Real_Real is selected and if bit 0 is a one, the Real_Imag is selected. Similarly, an imaginary multiplexer M2 selects either the Imag_Imag or Imag_Real as the imaginary contribution (ah_out_imag). If bit 0 is a zero, the Imag_Imag is selected and if bit 0 is a one, the Imag_Real is selected. Accordingly, the contribution of that burst to $A^H$ is determined. After all the bursts are determined, the entire $A^H$ is determined. As illustrated by the preferred embodiment, multipliers are not required for the production of the $A^H$ matrix.

In 3GPP, it is proposed to transmit the broadcast channel over two antennas using a different spreading code for each antenna, referred to hereafter as space code transmit diversity (SCTD). Since the same broadcast data is sent over the two channels, the contribution of each channel can be combined prior to data estimation. Furthermore, it is proposed that multiple broadcast channels as well as other channels may be transmitted using SCTD.

Figure 5:
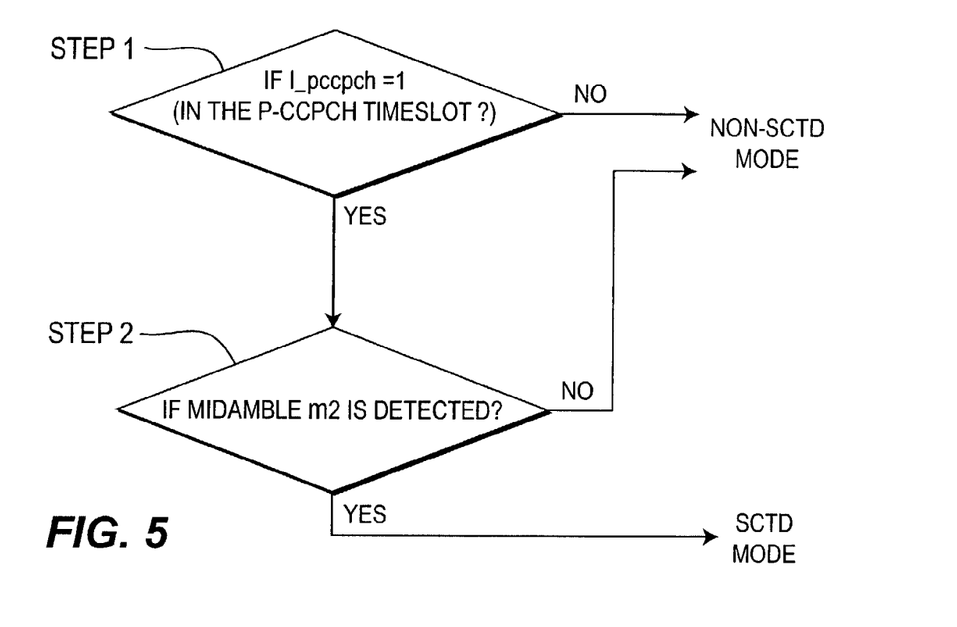
FIG. 5 shows a flow chart for determining whether space code transmit diversity is supported for the broadcast channel.

FIG. 5 is a preferred flow chart for determining whether combining of the two channel codes to support SCTD is required for a single BCH as currently proposed. The primary common control physical channel (P-CCPCH) is monitored to determine if SCTD mode is supported, SPEP1. If it is not (I_pccpch is zero), SCTD mode is not supported. If it is, a midamble detection device determines whether midamble m2 is present, STEP2. If m2 is present, SCTD mode is supported. If not, SCTD mode is not supported.

Figure 6A:
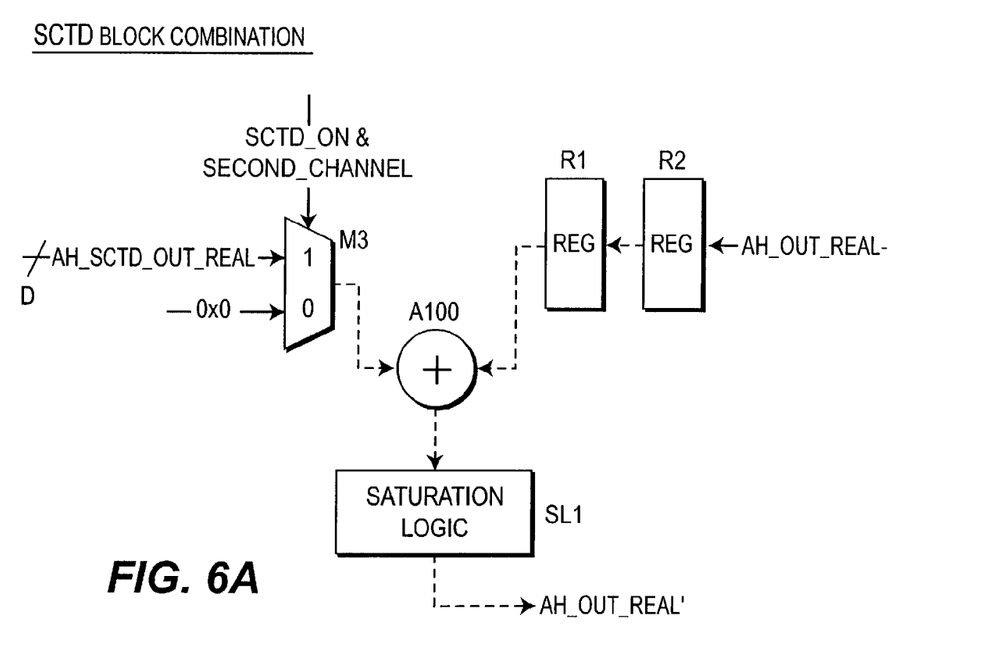
FIGS. 6A and 6B show preferred circuits for combining code contributions for input into the hermetian of the system response matrix.
Figure 6B:
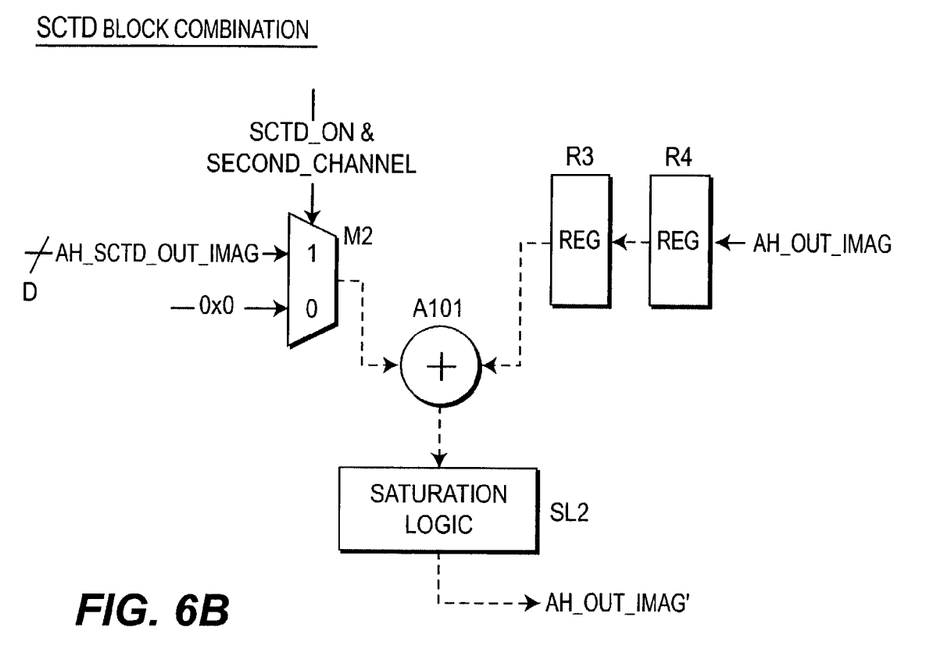
Figure 7:
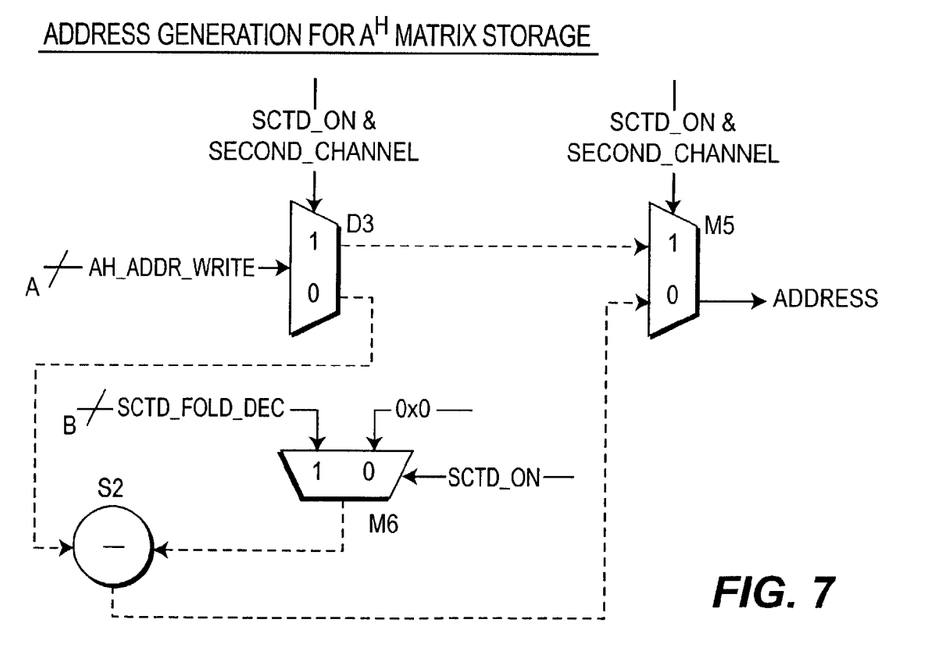
FIG. 7 shows a preferred circuit for determining the addresses for the circuits of FIGS. 6A and 6B.

FIGS. 6A, 6B and 7 illustrate a preferred embodiment for selectively supporting SCTD. The selective SCTD is preferably used with a single BCH, multiple BCHs and other channels transmitted using selective SCTD. FIG. 6A processes the real contribution of the channels. If SCTD is supported, the real contribution of a first code is referred to as ah_sctd_out_real and the second code ah_out_real. If SCTD is not supported, ah_sctd_out_real is not present.

ah_sctd_out_real is an input to a multiplexer M3. The other input is tied to zero (0x0). If SCTD is supported (sctd_on & second_channel is a one), ah_sctd_out_real is passed to an adder A100. If SCTD is not supported, zero is sent to the adder A100. ah_out_real is also input to the adder A100 to produce either the real combined contribution of the two channels, if SCTD is supported, or simply passes the channel (ah_out_real).(Note: there is no first or second channel if it isn't an SCTD channel.) Saturation logic SL1 is used to prevent the combined contributions from overflowing the bit width of the memory. As shown in FIG. 6A, preferably, two registers R1, R2 are used to temporarily buffer the contribution of the second channel (ah_out_real).

FIG. 6B processes the imaginary contribution of channels. If SCTD is supported, the imaginary contribution of a first code is referred to as ah_sctd_out_imag and the second code ah_out_imag. If SCTD is not supported, ah_sctd_out_imag is not present. ah_sctd_out-imag is an input to a multiplexer M4. The other input is tied to zero (0x0). If SCTD is supported (sctd_on & second_channel is a one), ah_sctd_out-imag is passed to an adder A101. If SCTD is not supported, zero is sent to the adder A101. ah_out_imag is also input to the adder A101 to produce either the imaginary combined contribution of the two channels, if SCTD is supported, or simply passes the channel (ah_out_imag). Saturation logic is used to prevent combined contributions from overflowing the bit width of the memory. As shown in FIG. 6B, preferably, two registers R3, R4 are used to temporarily buffer the contribution of the first channel (ah_out_imag).

This approach to combining the two channels reduces the memory requirement and the amount of time required to calculate the final result. As the second channel's contribution is processed, it is combined with the stored first channel and the combined channel is stored. Accordingly, the second channel is never stored. Preferably, the combined channel is written back to the addresses of the first channel. If the first channel is not stored in a read-modify-write memory, two registers R1, R2, R3, R4 as shown in FIGS. 6A and 6B are preferably used. If the first-channel memory is a read-modify-write memory, only one register R1, R3 is preferably used.

FIG. 7 is a preferred circuit for use in conjunction with FIGS. 6A and 6B in determining the address of the second code whether SCTD is or is not supported. As the $A^H$ matrix is developed, each produced value is preferably stored in a subsequent memory address. If the first two channels are combined for SCTD, the combined channel contributions are preferably overwrite the first channel to reduce the required memory. To illustrated, if SCTD is not supported, the sequential address for the first location of the second channel may be address 516. If SCTD is supported, that value will be combined with the first channel and written back to the first address of first channel memory, address 0.

The address that the determined channel value is written to, when SCTD is not supported, is ah_addr_write. A control signal, sctd_on & second_channel, indicates whether SCTD is supported. If SCTD is supported sctd_on & second_channel has a value of a zero and if not, sctd_on & second_channel has a value of one. The address is input to a demultiplexer D3. If SCTD is not supported (sctd_on & second_channel has a value one), the address is passed to a multiplexer M5. The multiplexer M5 passes the address on, if SCTD is not supported.

If SCTD is supported, the address (ah_addr_write) is input to a subtractor S2. The subtractor subtracts from the address the number of memory values of the first channel (sctd_fold_dec). To reduce power consumption when SCTD is not supported, a second multiplexer M6 is used. The multiplexer M6 selects sctd_fold_dec for input to the subtractor S2, when SCTD is supported (sctd_on is a one). If SCTD is not supported (sctd_on is a zero), a zero (0x0) is input to the subtractor S2. The output of the multiplexer M6 is input into the multiplexer M5. The multiplexer M5 selects the subtracted input, when SCTD is supported.

What is claimed is:

1. A method for determining a hermetian of a system response matrix for use estimating data of a plurality of transmitted data signal, the method comprising:
    providing channel codes and channel responses, the channel codes being a combination of a real spreading code, a complex scrambling code and a sign of a channel code specific multipler, the channel code specific multipliers having real and imaginary values;
    determining real and imaginary components of an approximate hermetian system response matrix using the channel codes and the channel responses; and
    applying a real/imaginary aspect of the channel code specific multiplier to the real and imaginary components of the approximate hermetian of the system response matrix to derive the hermetian of the system response matrix; and
    estimating the data of the plurality of transmitted data signals using a received vector corresponding to the plurality of transmitted data signal and the hermetian of the system response matrix.

2. The method of claim 1 wherein none of the steps utilize multiplications.

3. The method of claim 1 wherein the determining real and imaginary components comprises:
    processing the real portion of the channel responses with the channel components producing real and imaginary portions of real channel responses;
    processing the imaginary portion of the channel impulse responses with the channel components producing real and imaginary portions of imaginary channel responses;
    subtracting the real portion of the imaginary channel responses from the real portion of the real channel responses to produce the real components; and
    adding the imaginary portion of the real channel responses and taking a 2's complement of a result of the adding to produce the imaginary components.

4. The method of claim 3 wherein the applying the real/imaginary aspect of the channel code specific multipliers comprises:
    selecting the real component as a hermetian system response matrix real component, if the channel code specific multiplier is real;
    selecting the imaginary component as the hermetian system response matrix real component, if the channel code specific multiplier is imaginary;
    selecting a 2's complement of the real component as a hermetian system response matrix imaginary component, if the channel code specific multiplier is imaginary; and
    selecting the imaginary component as the system response matrix imaginary component, if the channel code specific multiplier is real.

5. An apparatus for producing a hermetian of a system response matrix for use in estimating data of a plurality of transmitted data signals, the apparatus comprising:
    means for producing channel codes, the channel codes comprising real spreading codes, complex scrambling codes and signs of channel code specific multipliers;
    means for determining real and imaginary components of an approximate hermetian system response matrix using the channel codes and the channel responses; and
    means for applying a real/imaginary aspect of the channel code specific multipliers to the real and imaginary components of the approximate hermetian of the system response matrix to derive the hermetian of the system response matrix; and
    means for estimating the data of the plurality of transmitted data signals using a received vector corresponding to the plurality of transmitted data signal and the hermetian of the system response matrix.

6. The apparatus of claim 5 wherein none of the means includes multipliers.

7. The apparatus of claim 5 wherein the means for determining real and imaginary components comprises:
    means for processing the real portion of the channel responses with the channel components producing real and imaginary portions of real channel responses;
    means for processing the imaginary portion of the channel impulse responses with the channel components producing real and imaginary portions of imaginary channel responses;
    means for subtracting the real portion of the imaginary channel responses from the real portion of the real channel responses to produce the real components; and
    means for adding the imaginary portion of the real channel responses and taking a 2's complement of a result of the adding to produce the imaginary components.

8. The apparatus of claim 7 wherein the means for applying the real/imaginary aspect of the channel code specific multipliers comprises:
    means for selecting the real component as a hermetian system response matrix real component, if the channel code specific multiplier is real;
    means for selecting the imaginary component as the hermetian system response matrix real component, if the channel code specific multiplier is imaginary;
    means for selecting a 2's complement of the real component as a hermetian system response matrix imaginary component, if the channel code specific multiplier is imaginary; and
    means for selecting the imaginary component as the system response matrix imaginary component, if the channel code specific multiplier is real.

9. A method for receiving a plurality of data signals in a code division multiple access communication system, at least one data signal transmitted over a plurality of antennas with each antenna transmitting the at least one data signal using a different channel code, the method comprising:
    receiving a received vector including the plurality of transmitted data signals;
    estimating a channel response for each of the data signals;
    producing channel codes, the channel codes being a combination of a real spreading code, a complex scrambling code and a sign of a channel code specific multipler, the channel code specific multipliers having real and imaginary values;
    determining real and imaginary components of an approximate hermetian system response matrix using the channel codes and the channel responses;
    applying a real/imaginary aspect of the channel code specific multiplier to the real and imaginary components of the approximate hermetian of the system response matrix to derive the hermetian of the system response matrix; and
    estimating the data using the received vector and the constructed hermetian of the system response matrix.

10. The method of claim 9 wherein the estimating is performed using a zero forcing algorithm.

11. The method of claim 9 wherein the estimating is performed using a minimum mean square error algorithm.

12. The method of claim 9 wherein the determining real and imaginary components comprises:
processing the real portion of the channel responses with the channel components producing real and imaginary portions of real channel responses;
processing the imaginary portion of the channel impulse responses with the channel components producing real and imaginary portions of imaginary channel responses;
subtracting the real portion of the imaginary channel responses from the real portion of the real channel responses to produce the real components; and
adding the imaginary portion of the real channel responses and taking a 2's complement of a result of the adding to produce the imaginary components.

13. The method of claim 12 wherein the applying the real/imaginary aspect of the channel code specific multipliers comprises:
selecting the real component as a hermetian system response matrix real component, if the channel code specific multiplier is real;
selecting the imaginary component as the hermetian system response matrix real component, if the channel code specific multiplier is imaginary;
selecting a 2's complement of the real component as a hermetian system response matrix imaginary component, if the channel code specific multiplier is imaginary; and
selecting the imaginary component as the system response matrix imaginary component, if the channel code specific multiplier is real.

14. A receiver for receiving a plurality of data signals transmitted in a code division multiple access format, the receiver comprising:
means for receiving a received vector including the plurality of transmitted data signals;
means for estimating a channel response for each of the data signals;
means for producing channel codes, the channel codes being a combination of a real spreading code, a complex scrambling code and a sign of a channel code specific multipler, the channel code specific multipliers having real and imaginary values;
means for determining real and imaginary components of an approximate hermetian system response matrix using the channel codes and the channel responses;
means for applying a real/imaginary aspect of the channel code specific multiplier to the real and imaginary components of the approximate hermetian of the system response matrix to derive the hermetian of the system response matrix; and
means for estimating the data using the received vector and the constructed hermetian of the system response matrix.

15. The receiver of claim 14 wherein the means for estimating is performed using a zero forcing algorithm.

16. The receiver of claim 14 wherein the means for estimating is performed using a minimum mean square error algorithm.

17. The receiver of claim 14 wherein the means for determining real and imaginary components comprises:
means for processing the real portion of the channel responses with the channel components producing real and imaginary portions of real channel responses;
means for processing the imaginary portion of the channel impulse responses with the channel components producing real and imaginary portions of imaginary channel responses;
means for subtracting the real portion of the imaginary channel responses from the real portion of the real channel responses to produce the real components; and
means for adding the imaginary portion of the real channel responses and taking a 2's complement of a result of the adding to produce the imaginary components.

18. The receiver of claim 14 wherein the means for applying the real/imaginary aspect of the channel code specific multipliers comprises:
means for selecting the real component as a hermetian system response matrix real component, if the channel code specific multiplier is real;
means for selecting the imaginary component as the hermetian system response matrix real component, if the channel code specific multiplier is imaginary;
means for selecting a 2's complement of the real component as a hermetian system response matrix imaginary component, if the channel code specific multiplier is imaginary; and
means for selecting the imaginary component as the system response matrix imaginary component, if the channel code specific multiplier is real.

19. A receiver for receiving a plurality of data signals transmitted in a code division multiple access format, the receiver comprising:
an antenna for receiving a received vector including the plurality of transmitted data signals;
a channel estimation device for estimating a channel response for each of the data signals; and
a joint detection device for estimating the data using the received vector and a hermetian of the system response matrix, comprising:
an exclusive-or gate for producing channel codes, the channel codes being a combination of a real spreading code, a complex scrambling code and a sign of a channel code specific multipler, the channel code specific multipliers having real and imaginary values;
a plurality of registers, adders, adder/subtractors and a 2's compliment component for determining real and imaginary components of an approximate hermetian system response matrix using the channel codes and the channel responses; and
a plurality of demultiplexers, multiplexers and a 2's compliment components for applying a real/imaginary aspect of the channel code specific multiplier to the real and imaginary components of the approximate hermetian of the system response matrix to derive the hermetian of the system response matrix; and
a joint detector device for estimating the data using the received vector and the constructed hermetian of the system response matrix.

20. The receiver of claim 19 wherein the joint detection device for estimating the data using a zero forcing algorithm.

21. The receiver of claim 19 wherein the joint detection device for estimating the data using minimum mean square error algorithm.

22. The receiver of claim 19 wherein the plurality of registers, adders, adder/subtractors and a 2's compliment components for processing the real portion of the channel responses with the channel components producing real and imaginary portions of real channel responses; for processing the imaginary portion of the channel impulse responses with the channel components producing real and imaginary portions of imaginary channel responses; for subtracting the real portion of the imaginary channel responses from the real portion of the real channel responses to produce the real components; and for adding the imaginary portion of the real channel responses and taking a 2's complement of a result of the adding to produce the imaginary components.

23. The receiver of claim 19 wherein:
a demultplexer and a multiplexer for selecting the real component as a hermetian system response matrix real component, if the channel code specific multiplier is real;
a demultplexer and a multiplexer for selecting the imaginary component as the hermetian system response matrix real component, if the channel code specific multiplier is imaginary;
the 2's complement component for taking a 2's complement of the real component;
a demultplexer and a multiplexer for selecting an output of the 2's complement component as a hermetian system response matrix imaginary component, if the channel code specific multiplier is imaginary; and
a demultplexer and a multiplexer for selecting the imaginary component as the system response matrix imaginary component, if the channel code specific multiplier is real.

24. A user equipment for receiving a plurality of data signals transmitted in a code division multiple access format, the user equipment comprising:
means for receiving a received vector including the plurality of transmitted data signals;
means for estimating a channel response for each of the data signals;
means for producing channel codes, the channel codes being a combination of a real spreading code, a complex scrambling code and a sign of a channel code specific multipler, the channel code specific multipliers having real and imaginary values;
means for determining real and imaginary components of an approximate hermetian system response matrix using the channel codes and the channel responses;
means for applying a real/imaginary aspect of the channel code specific multiplier to the real and imaginary components of the approximate hermetian of the system response matrix to derive the hermetian of the system response matrix; and
means for estimating the data using the received vector and the constructed hermetian of the system response matrix.

25. The user equipment of claim 24 wherein the means for estimating is performed using a zero forcing algorithm.

26. The user equipment of claim 24 wherein the means for estimating is performed using a minimum mean square error algorithm.

27. The user equipment of claim 24 wherein the means for determining real and imaginary components comprises:
means for processing the real portion of the channel responses with the channel components producing real and imaginary portions of real channel responses;
means for processing the imaginary portion of the channel impulse responses with the channel components producing real and imaginary portions of imaginary channel responses;
means for subtracting the real portion of the imaginary channel responses from the real portion of the real channel responses to produce the real components; and means for adding the imaginary portion of the real channel responses and taking a 2's complement of a result of the adding to produce the imaginary components.

28. The user equipment of claim 24 wherein the means for applying the real/imaginary aspect of the channel code specific multipliers comprises:
means for selecting the real component as a hermetian system response matrix real component, if the channel code specific multiplier is real;
means for selecting the imaginary component as the hermetian system response matrix real component, if the channel code specific multiplier is imaginary;
means for selecting a 2's complement of the real component as a hermetian system response matrix imaginary component, if the channel code specific multiplier is imaginary; and
means for selecting the imaginary component as the system response matrix imaginary component, if the channel code specific multiplier is real.

29. A user equipment for receiving a plurality of data signals transmitted in a code division multiple access format, the user equipment comprising:
an antenna for receiving a received vector including the plurality of transmitted data signals;
a channel estimation device for estimating a channel response for each of the data signals; and
a joint detection device for estimating the data using the received vector and a hermetian of the system response matrix, comprising:
an exclusive-or gate for producing channel codes, the channel codes being a combination of a real spreading code, a complex scrambling code and a sign of a channel code specific multipler, the channel code specific multipliers having real and imaginary values;
a plurality of registers, adders, adder/subtractors and a 2's compliment component for determining real and imaginary components of an approximate hermetian system response matrix using the channel codes and the channel responses; and
a plurality of demultiplexers, multiplexers and a 2's compliment components for applying a real/imaginary aspect of the channel code specific multiplier to the real and imaginary components of the approximate hermetian of the system response matrix to derive the hermetian of the system response matrix; and
a joint detector device for estimating the data using the received vector and the constructed hermetian of the system response matrix.

30. The user equipment of claim 29 wherein the joint detection device for estimating the data using a zero forcing algorithm.

31. The user equipment of claim 29 wherein the joint detection device for estimating the data using minimum mean square error algorithm.

32. The user equipment of claim 29 wherein the plurality of registers, adders, adder/subtractors and a 2's compliment components for processing the real portion of the channel responses with the channel components producing real and imaginary portions of real channel responses; for processing the imaginary portion of the channel impulse responses with the channel components producing real and imaginary portions of imaginary channel responses; for subtracting the real portion of the imaginary channel responses from the real portion of the real channel responses to produce the real components; and for adding the imaginary portion of the real channel responses and taking a 2's complement of a result of the adding to produce the imaginary components.

33. The user equipment of claim 29 wherein:
a demultplexer and a multiplexer for selecting the real component as a hermetian system response matrix real component, if the channel code specific multiplier is real;
a demultplexer and a multiplexer for selecting the imaginary component as the hermetian system response matrix real component, if the channel code specific multiplier is imaginary;
the 2's complement component for taking a 2's complement of the real component;
a demultplexer and a multiplexer for selecting an output of the 2's complement component as a hermetian system response matrix imaginary component, if the channel code specific multiplier is imaginary; and
a demultplexer and a multiplexer for selecting the imaginary component as the system response matrix imaginary component, if the channel code specific multiplier is real.

34. A base station for receiving a plurality of data signals transmitted in a code division multiple access format, the base station comprising:
means for receiving a received vector including the plurality of transmitted data signals;
means for estimating a channel response for each of the data signals;
means for producing channel codes, the channel codes being a combination of a real spreading code, a complex scrambling code and a sign of a channel code specific multiplier, the channel code specific multipliers having real and imaginary values;
means for determining real and imaginary components of an approximate hermetian system response-matrix using the channel codes and the channel responses;
means for applying a real/imaginary aspect of the channel code specific multiplier to the real and imaginary components of the approximate hermetian of the system response matrix to derive the hermetian of the system response matrix; and
means for estimating the data using the received vector and the constructed hermetian of the system response matrix.

35. The base station of claim 34 wherein the means for estimating is performed using a zero forcing algorithm.

36. The base station of claim 34 wherein the means for estimating is performed using a minimum mean square error algorithm.

37. The base station of claim 34 wherein the means for determining real and imaginary components comprises:
means for processing the real portion of the channel responses with the channel components producing real and imaginary portions of real channel responses;
means for processing the imaginary portion of the channel impulse responses with the channel components producing real and imaginary portions of imaginary channel responses;
means for subtracting the real portion of the imaginary channel responses from the real portion of the real channel responses to produce the real components; and
means for adding the imaginary portion of the real channel responses and taking a 2's complement of a result of the adding to produce the imaginary components.

38. The base station of claim 34 wherein the means for applying the real/imaginary aspect of the channel code specific multipliers comprises:
means for selecting the real component as a hermetian system response matrix real component, if the channel code specific multiplier is real;
means for selecting the imaginary component as the hermetian system response matrix real component, if the channel code specific multiplier is imaginary;
means for selecting a 2's complement of the real component as a hermetian system response matrix imaginary component, if the channel code specific multiplier is imaginary; and
means for selecting the imaginary component as the system response matrix imaginary component, if the channel code specific multiplier is real.

39. A base station for receiving a plurality of data signals transmitted in a code division multiple access format, the base station comprising:
an antenna for receiving a received vector including the plurality of transmitted data signals;
a channel estimation device for estimating a channel response for each of the data signals; and
a joint detection device for estimating the data using the received vector and a hermetian of the system response matrix, comprising:
an exclusive-or gate for producing channel codes, the channel codes being a combination of a real spreading code, a complex scrambling code and a sign of a channel code specific multipler, the channel code specific multipliers having real and imaginary values;
a plurality of registers, adders, adder/subtractors and a 2's compliment component for determining real and imaginary components of an approximate hermetian system response matrix using the channel codes and the channel responses; and
a plurality of demultiplexers, multiplexers and a 2's compliment components for applying a real/imaginary aspect of the channel code specific multiplier to the real and imaginary components of the approximate hermetian of the system response matrix to derive the hermetian of the system response matrix; and
a joint detector device for estimating the data using the received vector and the constructed hermetian of the system response matrix.

40. The base station of claim 39 wherein the joint detection device for estimating the data using a zero forcing algorithm.

41. The base station of claim 39 wherein the joint detection device for estimating the data using minimum mean square error algorithm.

42. The base station of claim 39 wherein the plurality of registers, adders, adder/subtractors and a 2's compliment components for processing the real portion of the channel responses with the channel components producing real and imaginary portions of real channel responses; for processing the imaginary portion of the channel impulse responses with the channel components producing real and imaginary portions of imaginary channel responses; for subtracting the real portion of the imaginary channel responses from the real portion of the real channel responses to produce the real components; and for adding the imaginary portion of the real channel responses and taking a 2's complement of a result of the adding to produce the imaginary components.

43. The base station of claim 39 wherein:
a demultplexer and a multiplexer for selecting the real component as a hermetian system response matrix real component, if the channel code specific multiplier is real;

a demultplexer and a multiplexer for selecting the imaginary component as the hermetian system response matrix real component, if the channel code specific multiplier is imaginary;

the 2's complement component for taking a 2's complement of the real component;

a demultplexer and a multiplexer for selecting an output of the 2's complement component as a hermetian system response matrix imaginary component, if the channel code specific multiplier is imaginary; and a demultplexer and a multiplexer for selecting the imaginary component as the system response matrix imaginary component, if the channel code specific multiplier is real.

44. A method for receiving a plurality of data signals in a code division multiple access communication system, at least one data signal transmitted over a plurality of antennas with each antenna transmitting the at least one data signal using a different channelization code, the channelization code comprising a real spreading code, a complex scrambling code and a channel code specific multiplier, the method comprising:

receiving a received vector including the plurality of transmitted data signals;

estimating a channel response for each of the data signals;

producing components of a hermetian of a system response matrix using the estimated channel response, real spreading codes, complex scrambling codes and signs of channel code specific multipliers of the data signals, the components including components of each version of the at least one data signal transmitted using each of the different channelization codes;

combining the components of each version and constructing the hermetian of the system response matrix using the combined components; and estimating the data using the received vector and the constructed hermetian of the system response matrix.

45. The method of claim 44 wherein the estimating is performed using a zero forcing algorithm.

46. The method of claim 44 wherein the estimating is performed using a minimum mean square error algorithm.

47. The method of claim 44 wherein the combining is performed using an adder and saturation logic.

48. A receiver for receiving a plurality of data signals transmitted in a code division multiple access format, at least one data signal transmitted over a plurality of antennas with each antenna transmitting the at least one data signal using a different channelization code, the channelization code comprising a real spreading code, a complex scrambling code and a channel code specific multiplier, the receiver comprising:

means for receiving a received vector including the plurality of transmitted data signals;

means for estimating a channel response for each of the data signals;

means for producing components of a hermetian of a system response matrix using the estimated channel response, real spreading codes, complex scrambling codes and signs of channel code specific multipliers of the data signals, the components including components of each version of the at least one data signal transmitted using each of the different channelization codes;

means for combining the components of each version and constructing the hermetian of the system response matrix using the combined components; and means for estimating the data using the received vector and the constructed hermetian of the system response matrix.

49. The receiver of claim 48 wherein the estimating is performed using a zero forcing algorithm.

50. The receiver of claim 48 wherein the estimating is performed using a minimum mean square error algorithm.

51. The receiver of claim 48 wherein the combining is performed using an adder and saturation logic.

52. A receiver for receiving a plurality of data signals transmitted in a code division multiple access format, at least one data signal transmitted over a plurality of antennas with each antenna transmitting the at least one data signal using a different channelization code, the channelization code comprising a real spreading code, a complex scrambling code and a channel code specific multiplier, the receiver comprising:

an antenna for receiving a received vector including the plurality of transmitted data signals;

a channel estimation device for estimating a channel response for each of the data signals;

a joint detection device for producing components of a hermetian of a system response matrix using the estimated channel response, real spreading codes, complex scrambling codes and signs of channel code specific multipliers of the data signals, the components including components of each version of the at least one data signal transmitted using each of the different channelization codes; for combining the components of each version and constructing the hermetian of the system response matrix using the combined components; and for estimating the data using the received vector and the constructed hermetian of the system response matrix.

53. The receiver of claim 52 wherein the estimating is performed using a zero forcing algorithm.

54. The receiver of claim 52 wherein the estimating is performed using a minimum mean square error algorithm.

55. The receiver of claim 52 wherein the combining is performed using an adder and saturation logic.

56. A user equipment for receiving a plurality of data signals transmitted in a code division multiple access format, at least one data signal transmitted over a plurality of antennas with each antenna transmitting the at least one data signal using a different channelization code, the channelization code comprising a real spreading code, a complex scrambling code and a channel code specific multiplier, the user equipment comprising:

means for receiving a received vector including the plurality of transmitted data signals;

means for estimating a channel response for each of the data signals;

means for producing components of a hermetian of a system response matrix using the estimated channel response, real spreading codes, complex scrambling codes and signs of channel code specific multipliers of the data signals, the components including components of each version of the at least one data signal transmitted using each of the different channelization codes;

means for combining the components of each version and constructing the hermetian of the system response matrix using the combined components; and means for estimating the data using the received vector and the constructed hermetian of the system response matrix.

57. The user equipment of claim 56 wherein the estimating is performed using a zero forcing algorithm.

58. The user equipment of claim 56 wherein the estimating is performed using a minimum mean square error algorithm.

59. The user equipment of claim 56 wherein the combining is performed using an adder and saturation logic.

60. A user equipment for receiving a plurality of data signals transmitted in a code division multiple access format, at least one data signal transmitted over a plurality of antennas with each antenna transmitting the at least one data signal using a different channelization code, the channelization code comprising a real spreading code, a complex scrambling code and a channel code specific multiplier, the user equipment comprising:

an antenna for receiving a received vector including the plurality of transmitted data signals;

a channel estimation device for estimating a channel response for each of the data signals;

a joint detection device for producing components of a hermetian of a system response matrix using the estimated channel response, real spreading codes, complex scrambling codes and signs of channel code specific multipliers of the data signals, the components including components of each version of the at least one data signal transmitted using each of the different channelization codes; for combining the components of each version and constructing the hermetian of the system response matrix using the combined components; and for estimating the data using the received vector and the constructed hermetian of the system response matrix.

61. The user equipment of claim 60 wherein the estimating is performed using a zero forcing algorithm.

62. The user equipment of claim 60 wherein the estimating is performed using a minimum mean square error algorithm.

63. The user equipment of claim 60 wherein the combining is performed using an adder and saturation logic.

64. A base station for receiving a plurality of data signals transmitted in a code division multiple access format, at least one data signal transmitted over a plurality of antennas with each antenna transmitting the at least one data signal using a different channelization code, the channelization code comprising a real spreading code, a complex scrambling code and a channel code specific multiplier, the base station comprising:

means for receiving a received vector including the plurality of transmitted data signals;

means for estimating a channel response for each of the data signals;

means for producing components of a hermetian of a system response matrix using the estimated channel response, real spreading codes, complex scrambling codes and signs of channel code specific multipliers of the data signals, the components including components of each version of the at least one data signal transmitted using each of the different channelization codes;

means for combining the components of each version and constructing the hermetian of the system response matrix using the combined components; and means for estimating the data using the received vector and the constructed hermetian of the system response matrix.

65. The base station of claim 64 wherein the estimating is performed using a zero forcing algorithm.

66. The base station of claim 64 wherein the estimating is performed using a minimum mean square error algorithm.

67. The base station of claim 64 wherein the combining is performed using an adder and saturation logic.

68. A base station for receiving a plurality of data signals transmitted in a code division multiple access format, at least one data signal transmitted over a plurality of antennas with each antenna transmitting the at least one data signal using a different channelization code, the channelization code comprising a real spreading code, a complex scrambling code and a channel code specific multiplier, the base station comprising:

an antenna for receiving a received vector including the plurality of transmitted data signals;

a channel estimation device for estimating a channel response for each of the data signals;

a joint detection device for producing components of a hermetian of a system response matrix using the estimated channel response, real spreading codes, complex scrambling codes and signs of channel code specific multipliers of the data signals, the components including components of each version of the at least one data signal transmitted using each of the different channelization codes; for combining the components of each version and constructing the hermetian of the system response matrix using the combined components; and for estimating the data using the received vector and the constructed hermetian of the system response matrix.

69. The base station of claim 68 wherein the estimating is performed using a zero forcing algorithm.

70. The base station of claim 68 wherein the estimating is performed using a minimum mean square error algorithm.

71. The base station of claim 68 wherein the combining is performed using an adder and saturation logic.

* * * * *

UNITED STATES PATENT AND TRADEMARK OFFICE
CERTIFICATE OF CORRECTION

PATENT NO. : 7,203,181 B2
APPLICATION NO. : 10/264192
DATED : April 10, 2007
INVENTOR(S) : Timmerman et al.

It is certified that error appears in the above-identified patent and that said Letters Patent is hereby corrected as shown below:

ON THE TITLE PAGE

At item (12), page 1, left column, line 2, delete "Trimmerman et al." and insert therefor --Timmerman et al.--.

At item (75), Inventors, page 1, left column, line 1, before "Harleysville", delete "Chayil S. Trimmerman," and insert therefor --Chayil S. Timmerman--.

IN THE ABSTRACT

At item (57), Abstract, page 1, right column, line 1, before the words "of a system", delete "hermetian" and insert therefor --Hermitian--.

At item (57), Abstract, page 1, right column, line 8, before the words "of the system", delete "hermetian" and insert therefor --Hermitian--.

At item (57), Abstract, page 1, right column, line 11, before the words "of the system", delete "hermetian" and insert therefor --Hermitian--.

At column 1, line 22, after the words "where all", delete "users" and insert therefor --users'--.

At column 1, line 32, after the word "vector", delete "r" and insert therefor --$\underline{r}$--.

At column 1, line 39, after the word "vector", delete "d" and insert therefor --$\underline{d}$--.

At column 1, delete Equation 1 and insert therefor --$A\underline{d} + \underline{n} = \underline{r}$--.

At column 1, line 45, before the first use of the words "is the", delete "d" and insert therefor --$\underline{d}$--.

At column 1, line 45, after the first use of the word "vector", delete "r" and insert therefor --$\underline{r}$--.

At column 1, line 45, after the second use of the word "vector", delete "n" and insert therefor --$\underline{n}$--.

At column 1, line 50, after the word "where", delete "n" and insert therefor --$\underline{n}$--.

At column 1, delete Equation 2 and insert therefor --$\underline{d} = (A^H A)^{-1} A^H \underline{r}$--.

At column 1, line 54, before "MMSE", delete "A" and insert therefor --An--.

At column 1, delete Equation 3 and insert therefor --$\underline{d} = R^{-1} A^H \underline{r}$--.

At column 1, line 59, after the word "noise", delete "n" and insert therefor --$\underline{n}$--.

At column 3, line 4, after the word "received", delete "bursts" and insert therefor --bursts'--.

At column 3, line 30, before the word "components", delete "and adder".

At column 4, line 34 and Equation 1, there is already an Equation 1 at column 1, line 42. Re-number Equation and text as --EQ. 5--.

At column 4, line 53, after "$A^H$. A", delete "subtracter" and insert therefor --subtractor--.

At column 5, line 51, after the word "supported", delete "SPEP1" and insert therefor --STEP1--.

At column 6, line 14, after the words "not present", delete "ah_sctd_out-imag" and insert therefor --ah_sctd_out_imag--.

At column 6, line 45, before the word "preferably", delete "are".

At column 6, line 46, after the word "To", delete "illustrated" and insert therefor --illustrate--.

The word "Hermetian" is misspelled throughout the claims. For every instance that "Hermetain" appears please delete and insert --Hermitian--.

At claim 1, column 7, line 7, after the word "use", insert --in--.

At claim 1, column 7, line 8, after the word "data", delete "signal" and insert therefor --signals--.

At claim 1, column 7, line 12, after the word "specific", delete "multipler" and insert therefor --multiplier--.

At claim 1, column 7, line 24, after the word "data", delete "signal" and insert therefor --signals--.

At claim 5, column 8, line 8, after the word "data", delete "signal" and insert therefor --signals--.

At claim 14, column 9, line 45, after the word "specific", delete "multipler" and insert therefor --multiplier--.

At claim 19, column 10, line 40, after the word "specific", delete "multipler" and insert therefor --multiplier--.

At claim 19, column 10, line 44, before the word "component", delete "compliment" and insert therefor --complement--.

At claim 19, column 10, line 49, before the word "components", delete "compliment" and insert therefor --complement--.

At claim 22, column 10, line 63, after the words "and a 2's", delete "compliment" and insert therefor --complement--.

At claim 23, column 11, line 9, before the words "and a multiplexer", delete "demultplexer" and insert therefor --demultiplexer--.

At claim 23, column 11, line 13, before the words "and a multiplexer", delete "demultplexer" and insert therefor --demultiplexer--.

At claim 23, column 11, line 19, before the words "and a multiplexer", delete "demultplexer" and insert therefor --demultiplexer--.

At claim 23, column 11, line 23, before the words "and a multiplexer", delete "demultplexer" and insert therefor --demultiplexer--.

At claim 24, column 11, line 37, after the word "specific", delete "multipler" and insert therefor --multiplier--.

At claim 29, column 12, line 33, after the word "specific", delete "multipler" and insert therefor --multiplier--.

At claim 29, column 12, line 38, before the word "component", delete "compliment" and insert therefor --complement--.

At claim 29, column 12, line 43, before the word "components", delete "compliment" and insert therefor --complement--.

At claim 32, column 12, line 58, after the words "and a 2's", delete "compliment" and insert therefor --complement--.

At claim 33, column 13, line 4, before the words "and a multiplexer", delete "demultplexer" and insert therefor --demultiplexer--.

At claim 33, column 13, line 8, before the words "and a multiplexer", delete "demultplexer" and insert therefor --demultiplexer--.

At claim 33, column 13, line 14, before the words "and a multiplexer", delete "demultplexer" and insert therefor --demultiplexer--.

At claim 33, column 13, line 18, before the words "and a multiplexer", delete "demultplexer" and insert therefor --demultiplexer--.

At claim 34, column 13, line 32, after the word "specific", delete "multipler" and insert therefor --multiplier--.

At claim 34, column 13, line 35, after the word "system", delete "response-matrix" and insert therefor --response matrix--.

CERTIFICATE OF CORRECTION (continued)
U.S. Pat. No. 7,203,181 B2

At claim 39, column 14, line 27, after the word "specific", delete "multipler" and insert therefor --multiplier--.

At claim 39, column 14, line 31, before the word "component", delete "compliment" and insert therefor --complement--.

At claim 39, column 14, line 36, before the word "components", delete "compliment" and insert therefor --complement--.

At claim 42, column 14, line 51, after the words "and a 2's", delete "compliment" and insert therefor --complement--.

At claim 43, column 14, line 64, before the words "and a multiplexer", delete "demultplexer" and insert therefor --demultiplexer--.

At claim 43, column 15, line 1, before the words "and a multiplexer", delete "demultplexer" and insert therefor --demultiplexer--.

At claim 43, column 15, line 7, before the words "and a multiplexer", delete "demultplexer" and insert therefor --demultiplexer--.

At claim 43, column 15, line 11, before the words "and a multiplexer", delete "demultplexer" and insert therefor --demultiplexer--.

Signed and Sealed this

Second Day of February, 2010

David J. Kappos
*Director of the United States Patent and Trademark Office*